United States Patent [19]

Kitazato

[11] Patent Number: 5,559,558
[45] Date of Patent: Sep. 24, 1996

[54] APPARATUS AND METHODOLOGY FOR CODING DIGITAL VIDEO SIGNALS TO IMPROVE PICTURE QUALITY WITH MINIMAL OVERHEAD

[75] Inventor: Naohisa Kitazato, Kanagawa, Japan

[73] Assignee: Sony Corporation, Tokyo, Japan

[21] Appl. No.: 286,210

[22] Filed: Aug. 5, 1994

[30] Foreign Application Priority Data

Aug. 31, 1993 [JP] Japan ................... 5-216099

[51] Int. Cl.⁶ .................................... H04N 7/12
[52] U.S. Cl. .................. 348/416; 348/415; 348/411; 348/414; 348/412
[58] Field of Search ................... 348/403, 411, 348/409, 407, 416, 420, 419, 412, 408

[56] References Cited

U.S. PATENT DOCUMENTS

| | | | |
|---|---|---|---|
| 5,107,345 | 4/1992 | Lee | 348/420 |
| 5,144,424 | 9/1992 | Savatier | 348/402 |
| 5,177,797 | 1/1993 | Takenaka et al. | 348/420 |
| 5,274,466 | 12/1993 | Ida et al. | 348/411 |
| 5,327,173 | 7/1994 | Nishizawa et al. | 348/420 |
| 5,351,083 | 9/1994 | Tsukagoshi | 348/409 |
| 5,400,076 | 3/1995 | Iwamura | 348/403 |
| 5,410,553 | 4/1995 | Choon | 348/409 |
| 5,442,400 | 8/1995 | Sun et al. | 348/409 |

*Primary Examiner*—Tommy P. Chin
*Assistant Examiner*—Anand Rao
*Attorney, Agent, or Firm*—William S. Frommer; Alvin Sinderbrand

[57] ABSTRACT

A method of coding a digital video signal and apparatus therefor receives the digital video signal and executes a first compression step in which a frame of the signal is coded using a correlation within the frame. A second compression step is then executed in which a frame of the signal is coded using a correlation between the frame and another frame of the signal. Selection processing is then carried out by which the output of one of the first and second compression steps is selected as an input frame of the video signal such that the output of the second compression step is utilized for at least two continuous frames of the video signal and the output of the first compression step is utilized for a single frame between two continuous frames of the video signal. In each of the first and second compression steps, one frame of the video signal is divided into a predetermined number of data sets, each of which includes a synchronizing code for detecting a start portion of the data set and each of which can be decoded independently of other data sets. The predetermined number of data sets derived at the first coding step being larger than the predetermined number of the data sets derived at the second coding step.

6 Claims, 4 Drawing Sheets

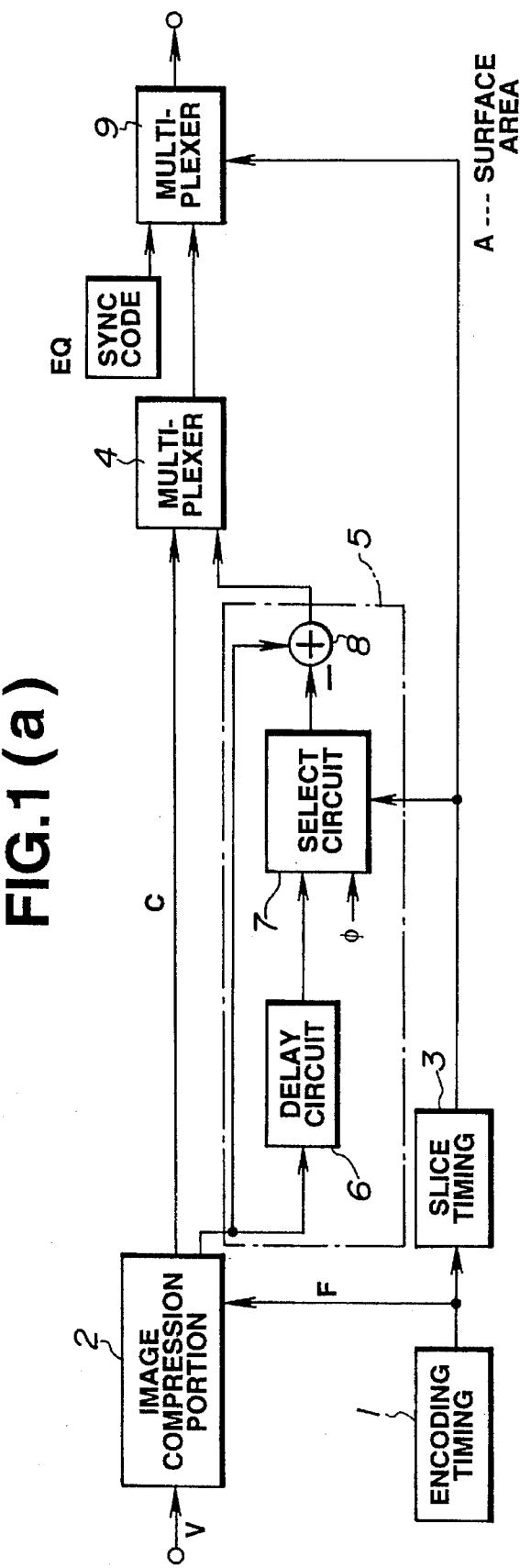
FIG.1(a)
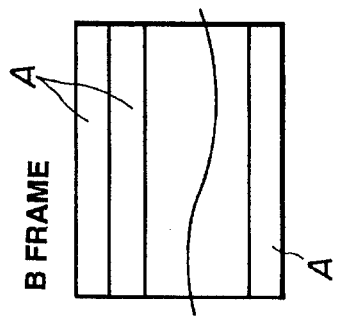
FIG.1(b) I FRAME
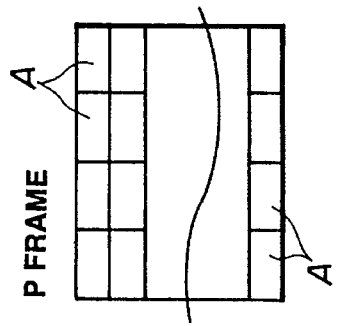
FIG.1(c) P FRAME
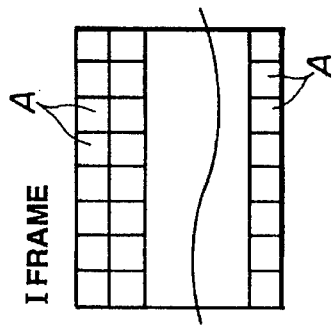
FIG.1(d) B FRAME

I FRAME

P FRAME

B FRAME

APPARATUS AND METHODOLOGY FOR CODING DIGITAL VIDEO SIGNALS TO IMPROVE PICTURE QUALITY WITH MINIMAL OVERHEAD

BACKGROUND OF THE INVENTION

1. Field of The Invention

The present invention relates generally to a method of coding a digital data signal. Particularly, the invention relates to a digital signal encoding method which can minimize visible error displayed after transmission reception without increasing an information volume overhead associated with the synchronization code and the like.

2. Description of The Related Art

In digital image transmission systems, a digital image signal is generally transmitted in compressed form. When such a compressed digital signal is received, it is expanded to obtain a playback image signal suitable for viewing. At the compression side of the system, a correlation between frames is utilized, generally via interframe coding between the compressed frames. According to this, based on the interframe coding only, when transmission error occurs in the transmission path, error propagation in the direction of time cannot be prevented. For prevention of such error propagation, coding is inserted into the transmission signal at every cycle of a set time period. As well as interframe coding, in frame coding may also be inserted every given time period.

Referring to FIG. 6, an I frame is provided within frame coding while P and B frames are provided with interframe coding. According to this, the content of an I frame before a P frame, or of a P frame only may be predicted, an I or P frame before or after a B frame may be predicted while other frames cannot be predicted.

At this, according to both types of coding, one frame of the digital video signal is divided into a plurality of data sets and each data set is decoded independently of other data sets. In addition, at the head of each data set, a synchronization code is added before transmission. Thus, at the reception side, decoding is carried out according to the unit of the data sets on the basis of the synchronization code.

According to the above system, with interframe coding there is a large disparity in the influence of error on transmission depending on the location of the error. For example, referring again to FIG. 6, if error occurs in an I frame, the influence thereof will affect all intermediate frames until the next I frame. If error occurs in a P frame, the influence thereof will affect the preceding two B frames and the frames after the P frame, while error occuring in a B frame will not influence other frames. In addition, transmission error occuring in a frame coded with in frame coding has the most visible influence.

Also, such error will be visibly manifest on a a display screen displaying the digital video signal, from the location of the error until the detection of the subsequent synchronization code. In such case in order to minimize the effect of the error, it is necessary to increase the number of data sets per frame, this however, reduces a surface area of each data set. According to this, the information volume overhead, of the synchronization code, etc., is increased. However, according to such increase, overall image quality is degraded.

Thus it has been required to provide a coding system for a digital video signal which may minimize visible error displayed after reception without increasing an information volume of overhead associated with the synchronization code and the like.

SUMMARY OF THE INVENTION

It is therefore a principal object of the present invention to overcome the drawbacks of the related art.

It is a further object of the present invention to provide a method of coding a digital data signal by which high image quality and low visible error may be assured without increase of an information volume of synchronization code overhead, or the like.

In order to accomplish the aforementioned and other objects, a method of coding a digital video signal having a plurality of sequential frames is provided, comprising the steps of: an input step of receiving the digital video signal; a first compression coding step coding a frame of the digital video signal using a correlation within the frame of the digital video signal; a second compression coding step coding a frame of the digital video signal using a correlation between the frame and another frame of the digital video signal; and a selecting step selecting one of the first and second compression coding steps as an input frame of the digital video signal such that the selecting step selects the second compression coding step for at least two continuous frames of the digital video signal and selects the first compression coding step for a single frame between two continuous frames of the digital video signal; wherein, in each of the first and second compression coding steps, one frame of the digital video signal is divided into a predetermined number of data sets, each of which includes a synchronizing code for detecting a start portion of the data set and each of which can be decoded independently of other data sets, the predetermined number of data sets derived at the first coding step being larger than the predetermined number of the data sets derived at the second coding step.

According to another aspect of the invention, there is provided an apparatus for coding a digital video signal having a plurality of sequential frames, comprising: input means receiving the digital video signal; first compression means active to code a frame of the digital video signal using a first correlation within the frame of the digital video signal and outputting a signal indicative thereof, wherein the first compression means is operable to divide one frame of the digital video signal into a predetermined number of data sets each of which includes a synchronizing code for detecting a start portion of the data set, such that each of the data sets is decodable independently of other data sets; second compression means active to code a frame of the digital video signal using a second correlation within the frame of the digital video signal and outputting a signal indicative thereof, wherein the second compression means is operable to divide one frame of the digital video signal into a predetermined number of data sets each of which includes a synchronizing code for detecting a start portion of the data set, such that each of the data sets is decodable independently of other data sets, the predetermined number of data sets determined by the second compression means being less than the predetermined number of data sets determined by the first compression means; and selecting means active to select an output of one of the first and second compression means as an input frame of the digital video signal such that the selecting means selects the output of the second compression means for at least two continuous frames and selects the output of the first compression means for a single frame between two continuous frames.

BRIEF DESCRIPTION OF THE DRAWINGS

In the drawings:

FIG. 1(A) is a block diagram of a circuit for coding a digital data signal according to the invention;

FIGS. 1(B)–(D) are examples respectively showing a surface area of data sets of sample frames I, P and B of a digital video signal according to the preferred embodiment of the invention;

DESCRIPTION OF THE PREFERRED EMBODIMENT

Figure 2:
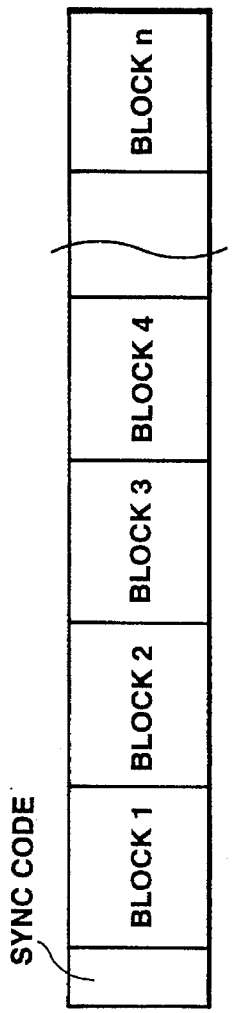
FIG. 2 shows a configuration of a data stream of respective data sets of the digital data signal.

Referring now to the drawings, a coding method for a sequential frame type digital information data signal according to the invention will be described hereinbelow in detail.

Referring to FIG. 1(A), a block diagram of a first embodiment circuit for coding a digital video signal is shown. As may be seen, the apparatus for carrying out the method of the invention comprises an encoding timing circuit 1 for setting a frame order, or sequence, via frame discriminating signals I, P, B, distinguishing different types of frames, which are output to an image compression circuit 2 (FIG. 5), and a slice timing circuit 3.

The compression circuit 2 receives a digital video signal and the frame discriminating signals. Based on the I frame discriminating signal, the compression circuit 2 may recognize the appropriate frame type independently of other frames via coding within the frame, or in frame coding. The P frame discriminating signal is utilized for correlation of a preceding I or P frame based on a between frame, or interframe coding and, the B frame discriminating signal is utilized for correlating adjacent P and/or I frames before or after the current frame based on interframe coding. Then, a data block is defined at this time between a width dot 'n' and a length 'M' dot and data compression is applied to the block while a motion vector therefor is output.

The slice timing circuit 3 is responsive to the content of the discriminating signals (I, P, B) to output a slice start timing signal. The slice start timing signal is active to determine data sets and produce data set signals from a block, or from a plurality of blocks. The block number of the data set signal produced at this time differs depending on the type of frame. The slice start timing signal may be output according to blocks respectively including data sets from I frames, P frames and B frames, identified as $N_I$, $N_P$, and $N_B$, wherein the signal timing is set according to the relation $N_I < N_P < N_B$. FIGS. 1(B)–(C) shows examples of surface areas A of data sets corresponding to different types of frames.

The compression circuit 2 outputs compressed information data to a multiplex circuit 4 and compressed motion vector data to a motion vector compression portion 5, respectively.

The motion vector compression portion 5 includes a delay circuit 6. The delay circuit 6 is active to delay motion vector data corresponding to a given block and output the delayed motion vector data to a selecting circuit 7 which also receives the slice timing signal from the slice timing circuit 3. The selecting circuit 7 then outputs data corresponding to a single block at a zero output level to an adder 8 which also receives the compressed motion vector data signal from the compression circuit 2. The adder 8 is active to subtract the output of the selecting circuit 7 from the compressed motion vector data signal from the compression circuit 2. The motion vector of the start block of the data set output from the adder 8 is independent of the motion vector data of the previous block and, starting with the output of data of a block after the start block, end data of the motion vector of the previous block is also output. Thus, according to the invention, each motion vector data for each data set is independent of those of other data sets.

The motion vector data from the adder 8 is forwarded to the multiplex circuit 4 where the compressed information data is multiplexed and forwarded to a second stage multiplex circuit 9 which further receives the slice start timing signal from the slice timing circuit 3. Based on the slice timing signal the second stage multiplex circuit 9 is active to insert a synchronization code at the start of the data set according to the operation of the select circuit 7. The synchronization code can be established as an independent signal, that is, the code is not dependent on other data sets. Further, during decoding of the concerned data set, the start thereof is detected. At this, the synchronization code is added to the data stream as shown in FIG. 2.

Figure 3:
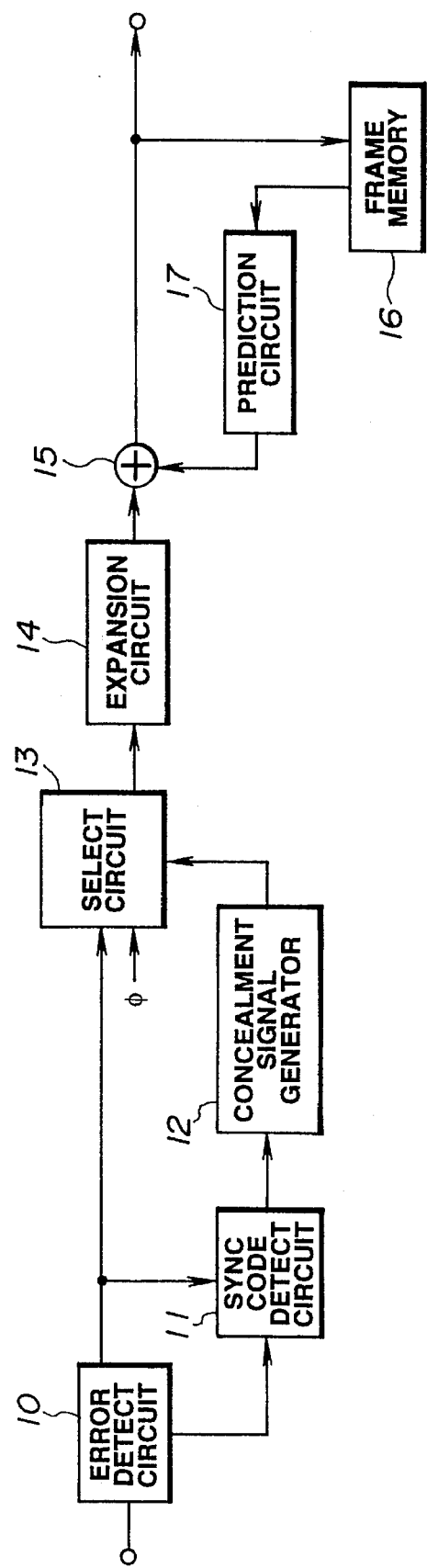
FIG. 3 is a block diagram of a coding circuit according to a preferred embodiment of the invention.

Referring now to FIG. 3, a decoding portion of the apparatus of the invention will be described hereinbelow in detail. First, the received signal is input to an error detection circuit 10. The error detection circuit outputs an error detection signal as well as the synchronization code to a synchronization code detection circuit 11. The synchronization code detection circuit 11 is active to output the error detection signal and, immediately afterward to refer to the sychronization code. Then, the synchronization code detection circuit 11 outputs a pulse signal indicative of the input time of the error detection code and the detected synchronization code to a concealment signal generator 12.

The concealment signal generator 12 is active to generate an error boundary signal, from the time point of detection of an error until the next detected sychronization code, to a select circuit 13. The select circuit 13 continuously receives and outputs the signal from the error detect circuit and, upon receiving the error boundary signal from the concealment generator circuit 12, is active to produce a zero output. The output of the select circuit 13 is input to an expansion circuit 14 which passes the signal to an adder 15 for expansion. The adder 15 further receives data related to the previous one frame of image data from a frame memory 16. This image data is delivered in the form of a predicted image signal supplied via a prediction circuit 17. The adder 15 receives the signals from the expansion circuit 14 and the prediction circuit 17 at both inputs thereof for producing a playback signal which is output from the adder 15.

Figure 6:
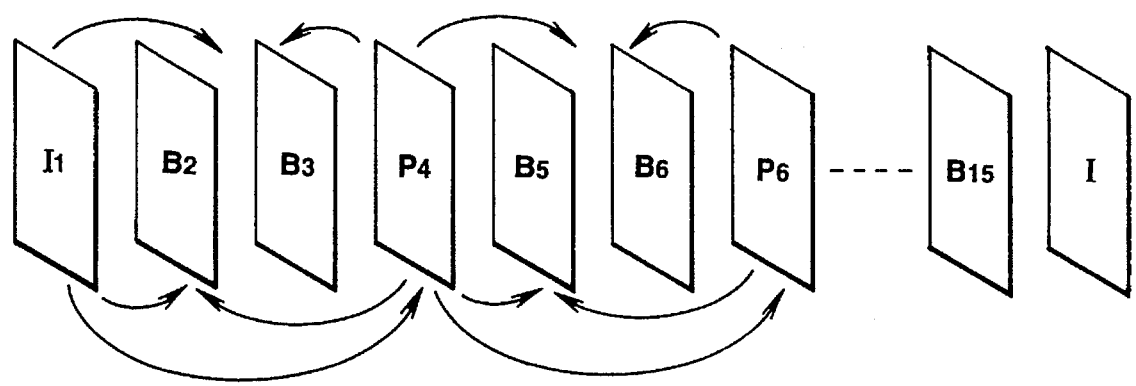
FIG. 6 shows examples of a coding format for respective frames.

Hereinbelow, the operation of the above described system will be described in detail. First the digital image signal and the single frame discriminating signal from the encoding timing circuit 1 are input to the image circuit 2. At the compression circuit 2, the frames are encoded as shown in FIG. 6. The slice timing circuit 3 outputs a slice head timing signal based on the frame discriminating signal from the encoding timing circuit 1, and according to the type of frame, the areas of data sets of the frames is set as shown in FIGS. 1(B)–(D) and a data stream is produced.

The compressed data stream is input to the decoding portion where the error detection portion determines whether or not transmission error is present in the received signal. If transmission error is present, the select circuit 13 is active to output zero data from the point of error until the end of the current data set. At the adder 15 the output of the select circuit 13, through the expansion circuit 14 is interpolated with the output of the prediction circuit 17. That is, from the point of error to the end of the current data set is concealed.

Figure 4A:
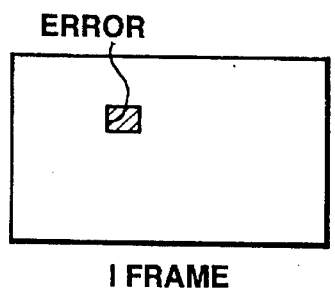
FIGS. 4(A)–(C) respectively show examples of concealment regions of the sample frames I, P and B.
Figure 4B:
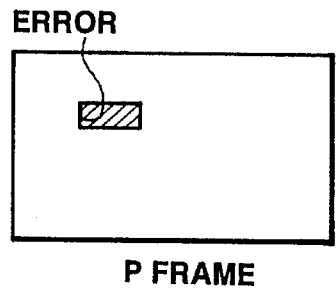
Figure 4C:
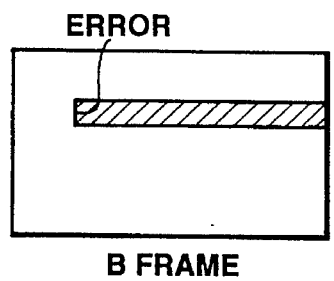

Referring to FIG. 4, it will be noted that different surface areas are present for data sets associated with different type of frames (I, P, B), thus, the concealment area for different types of frames is also different. The concealment area corresponds to the surface area of data sets of the various types of frames, that is the concealment area for B frames, P frames, and I frames are progressively smaller, as shown in FIG. 4. Thus, when B frame data is used as prediction data for another frame, the visual influence of data error so concealed is small. When P frame data is used as prediction data (that is stored in frame memory to be accessed by the prediction circuit for error concealment) for another frame, the visual influence of such concealment is larger and when I frame data is used as prediction data for another type of frame, the visual influence such concealment is largest. Since the visual influence of error becomes larger as the surface area A of the data sets become smaller, visible interruption due to error can be suppressed. Also, since the data sets of all frame types are not made smaller, an information volume overhead associated with the synchronization code and the like, is not increased and, suppression of visible interruption due to error can be provided without degradation of image quality.

Figure 5:
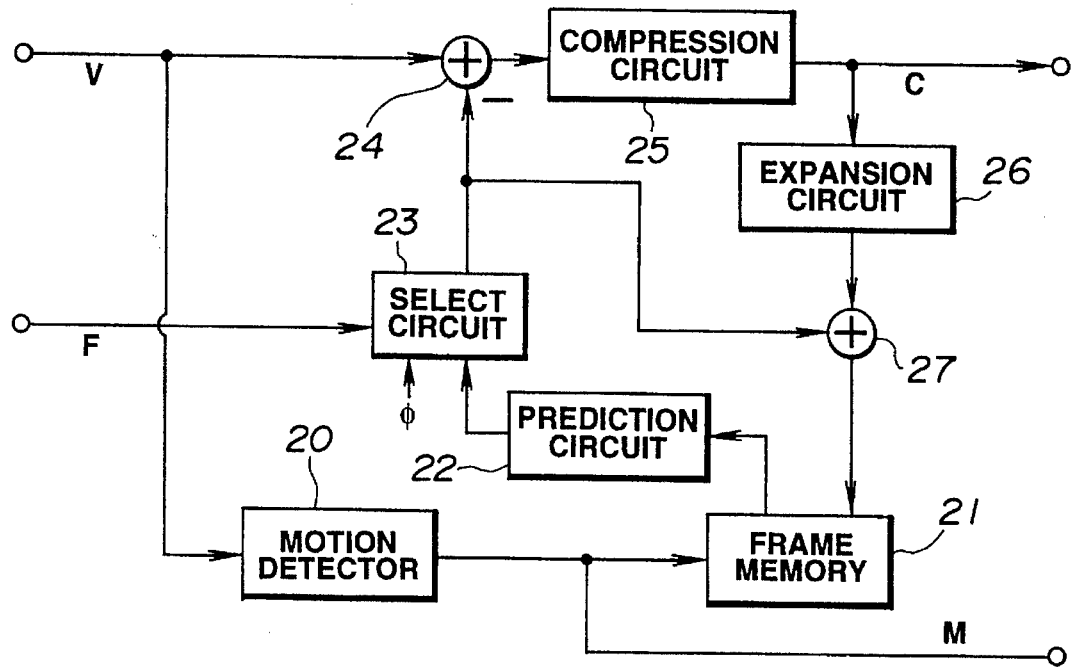
FIG. 5 shows a block diagram of an image compression circuit according to the invention.

Referring now to FIG. 5, a block diagram of the compression circuit 2 according to a preferred embodiment of the invention is shown. According to input of the digital video signal to a motion detection portion 20, motion of the image signal is detected, and one set of motion vector data is output in data block units. At the frame memory 21, the data from a previously compressed and expanded single frame is stored based on the motion vector data output by the motion detector 20 and output to a prediction circuit 22. The prediction circuit utilizes this data for prediction, or correction, of the current frame and outputs same to the select circuit 23.

The frame discriminating signals pass through a select circuit 23. In case of a P or B type frame discriminating signal, the select circuit also passes the output of the prediction circuit 22 to an adder 24. At the adder, a difference between the data from the select circuit and the data of the digital video signal is output as difference data to a compression circuit 25. When an I frame discriminating signal is received by the select circuit 23, a zero level is output to the adder 24 and the adder 24 outputs the actual data comprising the digital video signal for transmission to the compression circuit 25.

The output of the compression circuit 25 is the compressed (e.g. DCT compressed and quantized) digital video signal which may be broadcast to be received by a decoding arrangement as previously described. It will be noted that the compressed digital video signal is supplied to an expansion circuit 26 of the compression circuit 2 to be combined with the output of the select circuit 23 at an adder 27. The output of the adder 27 is supplied to the frame memory 21.

Also, it Will be noted that the invention according to the above-disclosed embodiment teaches operation in a system with three frame types, namely I, P and B frames. However the present invention may be operable in systems having more than three types of frames substantially without modification.

While the present invention has been disclosed in terms of the preferred embodiment in order to facilitate better understanding thereof, it should be appreciated that the invention can be embodied in various ways without departing from the principle of the invention. Therefore, the invention should be understood to include all embodiments which can be embodied without departing from the principle of the invention as set forth in the appended claims.

What is claimed is:

1. A method of coding a digital video signal having a plurality of frames, comprising the steps of:

receiving said digital video signal;

coding each frame of said digital video signal according to one of a plurality of coding techniques to produce a coded frame;

slicing each coded frame into a number of independently decodable data sets, said number corresponding to the coding technique employed to produce the coded frame; and adding a synchronization code to each of the data sets;

wherein the number of data sets corresponding to each of said plurality of coding techniques is predetermined; and wherein the number of data sets corresponding to a particular coding technique is unique to said particular coding technique.

2. A method of coding a digital video signal having a plurality of frames, comprising the steps of:

receiving said digital video signal;

intraframe coding a first frame of said digital video signal;

interframe coding a second frame of said digital video signal;

slicing said first frame into a first number of independently decodable data sets;

adding a synchronization code to each of said first number of data sets;

slicing said second frame into a second number of independently decodable data sets, wherein said first number is greater than said second number; and adding a synchronization code to each of the second number of data sets.

3. The method of coding according to claim 2, further comprising the steps of:

interframe coding a third frame of said digital video signal;

slicing said third frame into a third number of independently decodable data sets; and adding a synchronization code to each of the third number of data sets; and wherein said second number is greater than said third number.

4. The method of coding according to claim 3, wherein said first, second, and third numbers are predetermined.

5. The method of coding according to claim 3, wherein said second frame is predictively encoded and wherein said third frame is bidirectionally predictively encoded.

6. An apparatus for coding a digital video signal having a plurality of frames, comprising:

means for receiving said digital video signal;

means for coding each frame of said digital video signal according to one of a plurality of coding techniques to produce a coded frame;

means for slicing each coded frame into a number of independently decodable data sets, said number corresponding to the coding technique employed to produce the coded frame; and means for adding a synchronization code to each of the data sets;

wherein the number of data sets corresponding to each of said plurality of coding techniques is predetermined; and wherein the number of data sets corresponding to a particular coding technique is unique to said particular coding technique.

* * * * *